United States Patent
Ogasawara

(10) Patent No.: US 11,892,074 B2
(45) Date of Patent: Feb. 6, 2024

(54) TRANSMISSION LUBRICATING STRUCTURE OF HELICOPTER

(71) Applicant: KAWASAKI JUKOGYO KABUSHIKI KAISHA, Kobe (JP)

(72) Inventor: Kenta Ogasawara, Akashi (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 192 days.

(21) Appl. No.: 17/277,497

(22) PCT Filed: Sep. 19, 2019

(86) PCT No.: PCT/JP2019/036719
§ 371 (c)(1),
(2) Date: Mar. 18, 2021

(87) PCT Pub. No.: WO2020/059785
PCT Pub. Date: Mar. 26, 2020

(65) Prior Publication Data
US 2022/0034397 A1    Feb. 3, 2022

(30) Foreign Application Priority Data

Sep. 21, 2018 (JP) ................................. 2018-176772

(51) Int. Cl.
*F16H 57/04* (2010.01)
*F16N 7/02* (2006.01)

(52) U.S. Cl.
CPC ....... *F16H 57/0442* (2013.01); *F16H 57/043* (2013.01); *F16H 57/0456* (2013.01); *F16H 57/0465* (2013.01); *F16N 7/02* (2013.01)

(58) Field of Classification Search
CPC ............... F16H 57/043; F16H 57/0442; F16H 57/0456; F16H 57/0463; F16H 57/0465; F16N 7/02
See application file for complete search history.

(56) References Cited

U.S. PATENT DOCUMENTS 3,075,690 A * 1/1963 Luenberger ......... F16H 57/0421
184/6.12
4,700,808 A * 10/1987 Haentjens ........... F16C 33/6659
184/11.2

(Continued)

FOREIGN PATENT DOCUMENTS

JP         2007-8461 A      1/2007

*Primary Examiner* — Minh Truong
(74) *Attorney, Agent, or Firm* — Sughrue Mion, PLLC

(57) ABSTRACT

A transmission lubricating structure includes a power transmitting shaft, a main lubricating circuit, and an auxiliary lubricating circuit. The power transmitting shaft includes an ejection hole communicating an inside with an outside of the power transmitting shaft. The main lubricating circuit includes: a main nozzle having a nozzle hole through which lubricating oil supplied from a main tank is discharged to the internal space of the power transmitting shaft; and a hydraulic pump configured to supply the lubricating oil by pressure from the main tank to the main nozzle. The auxiliary lubricating circuit includes an auxiliary nozzle arranged lower than an auxiliary tank and higher than a lubrication target at the outside of the power transmitting shaft, the auxiliary nozzle being configured to drop the lubricating oil, supplied from the auxiliary tank by an own weight of the lubricating oil, toward the lubrication target.

3 Claims, 1 Drawing Sheet

(56) References Cited

U.S. PATENT DOCUMENTS

| | | | | |
|---|---|---|---|---|
| 4,856,273 | A | * | 8/1989 | Murray ................... F01D 25/18 |
| | | | | 384/473 |
| 5,121,815 | A | * | 6/1992 | Francois ................. B64C 27/12 |
| | | | | 184/6.12 |
| 5,520,468 | A | * | 5/1996 | Iguchi ................. F16C 33/6659 |
| | | | | 384/473 |
| 7,651,049 | B2 | * | 1/2010 | Carnelli .................... F16N 7/38 |
| | | | | 184/65 |
| 8,997,937 | B2 | * | 4/2015 | Sinusas ..................... F16N 7/18 |
| | | | | 184/77 |
| 10,012,305 | B2 | * | 7/2018 | Louis .................. F16H 57/0442 |
| 10,697,586 | B2 | * | 6/2020 | Poster ....................... F02C 7/36 |
| 10,808,826 | B2 | * | 10/2020 | Brodnicki .............. B64D 45/00 |
| 11,009,116 | B2 | * | 5/2021 | Olson ................. F16H 57/0457 |
| 2002/0048517 | A1 | * | 4/2002 | Sugita ................. F16C 33/6674 |
| | | | | 417/12 |
| 2009/0071753 | A1 | | 3/2009 | Carnelli et al. |
| 2021/0102617 | A1 | * | 4/2021 | Morreale ................... F02C 7/06 |
| 2022/0034396 | A1 | * | 2/2022 | Ogasawara ........... F16H 57/043 |

* cited by examiner

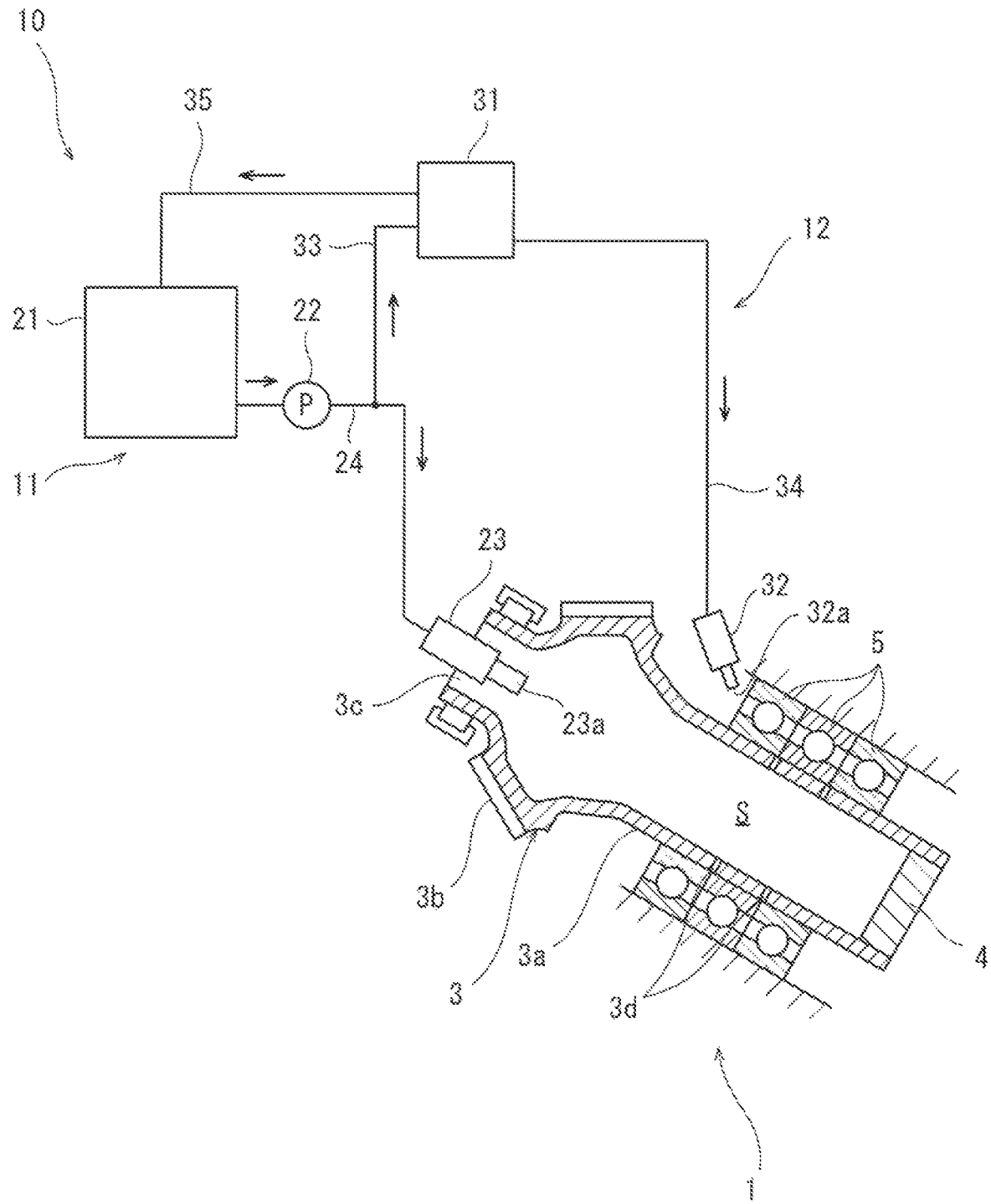

TRANSMISSION LUBRICATING STRUCTURE OF HELICOPTER

CROSS REFERENCE TO RELATED APPLICATIONS

This application is a National Stage of International Application No. PCT/JP2019/036719 filed Sep. 19, 2019, claiming priority based on Japanese Patent Application No. 2018-176772 filed Sep. 21, 2018.

TECHNICAL FIELD

The present invention relates to a transmission lubricating structure of a helicopter.

BACKGROUND ART

A lubricating system for a transmission of a helicopter is required to have a continuously operating ability in emergency. In recent years, further improvement of the continuously operating ability is required. Therefore, proposed is a configuration in which: an auxiliary lubricating circuit is provided separately from a main lubricating circuit; and a transmission is lubricated by the auxiliary lubricating circuit in emergency (see PTL 1, for example). In PTL 1, an auxiliary tank is provided in addition to a main tank, and lubricating oil is discharged from a main nozzle connected to the main tank and an auxiliary nozzle connected to the auxiliary tank to an internal space of a hollow power transmitting shaft. The lubricating oil supplied to the internal space of the power transmitting shaft is ejected to an outside by centrifugal force of the rotating power transmitting shaft through an ejection port formed on an outer peripheral surface of the power transmitting shaft.

CITATION LIST

Patent Literature

PTL 1: Japanese Laid-Open Patent Application Publication No. 2007-8461

SUMMARY OF INVENTION

Technical Problem

According to the configuration of PTL 1, in normal time in which the main lubricating circuit is normal, an adequate amount of lubricating liquid supplied by pressure by a hydraulic pump is continuously supplied through the main nozzle to the internal space of the power transmitting shaft. Therefore, an adequate amount of lubricating oil is ejected from the ejection hole of the power transmitting shaft, and the lubricating oil reaches a bearing supporting the power transmitting shaft. Thus, friction of the bearing is suppressed.

However, in emergency of the main lubricating circuit, the lubricating oil stored in the auxiliary tank is supplied little by little from the auxiliary nozzle to the internal space of the power transmitting shaft by the own weight of the lubricating oil in the auxiliary tank while taking time. Therefore, the amount of lubricating oil supplied to the internal space of the power transmitting shaft significantly decreases. In this case, the entire amount of lubricating oil ejected from the ejection port by the centrifugal force generated by the rotation of the power transmitting shaft decreases. However, since only part of the lubricating oil ejected from the ejection port to an outside reaches the bearing, a lubricating effect of the bearing deteriorates, and it becomes difficult to improve the continuously operating ability.

An object of the present invention is to provide a lubricating structure configured such that: in normal time in which a main lubricating circuit is normal, an adequate amount of lubricating liquid is ejected; and in emergency of the main lubricating circuit, a lubrication target is appropriately lubricated by an auxiliary lubricating circuit, and therefore, a continuously operating ability can be improved.

Solution to Problem

A transmission lubricating structure of a helicopter according to one aspect of the present invention includes: a hollow power transmitting shaft including an ejection hole through which an internal space of the power transmitting shaft communicates with an outside of the power transmitting shaft; a main lubricating circuit including a main tank in which lubricating oil is stored, a main nozzle having a nozzle hole through which the lubricating oil supplied from the main tank is discharged to the internal space of the power transmitting shaft, and a hydraulic pump configured to supply the lubricating oil by pressure from the main tank to the main nozzle; and an auxiliary lubricating circuit including an auxiliary tank in which the lubricating oil is stored and an auxiliary nozzle arranged lower than the auxiliary tank and higher than a lubrication target at the outside of the power transmitting shaft, the auxiliary nozzle being configured to drop the lubricating oil, supplied from the auxiliary tank by an own weight of the lubricating oil, toward the lubrication target.

According to the above configuration, in normal time in which the main lubricating circuit is normal, the lubricating oil in the main tank is supplied by the hydraulic pump through the main nozzle to the internal space of the power transmitting shaft, and an adequate amount of lubricating liquid is ejected through the ejection hole of the power transmitting shaft to the outside. Thus, frictional heat of the lubrication target is suppressed by the lubricating oil which has reached the lubrication target. In contrast, in emergency of the main lubricating circuit, the lubricating oil drops from the auxiliary nozzle of the auxiliary lubricating circuit toward the lubrication target by the own weight of the lubricating oil, and most of the lubricating oil from the auxiliary nozzle reaches the lubrication target. Thus, the lubrication target can be appropriately lubricated. Therefore, the continuously operating ability in emergency can be improved while improving a friction suppressing effect of the transmission in normal time.

A nozzle hole of the auxiliary nozzle may be smaller than a nozzle hole of the main nozzle.

According to the above configuration, a decreasing rate of the lubricating oil stored in the auxiliary tank can be suppressed while appropriately lubricating the lubrication target in emergency.

The main lubricating circuit may include a main line through which the lubricating oil in the main tank is introduced to the main nozzle. The auxiliary lubricating circuit may include a supply line through which the lubricating oil in the main tank is introduced to the auxiliary tank and an auxiliary line through which the lubricating oil in the auxiliary tank is introduced to the auxiliary nozzle.

According to the above configuration, part of the lubricating oil supplied by pressure by the hydraulic pump of the main lubricating circuit to the main line is supplied through the supply line to the auxiliary tank. Therefore, the auxiliary tank can be filled with the lubricating oil. Moreover, the auxiliary line is prepared separately from the main line. Therefore, even when abnormality occurs in the main line, the lubricating oil can be appropriately supplied form the auxiliary tank to the auxiliary nozzle.

The lubrication target may include a plurality of lubricated elements lined up in an upper-lower direction. The auxiliary nozzle may drop the lubricating liquid to the plurality of lubricated elements from above.

According to the above configuration, the lubricating liquid which has dropped from the auxiliary nozzle serially lubricates the plurality of lubricated elements in order. Therefore, the plurality of lubricated elements can be suitably lubricated by a small amount of lubricating liquid.

Advantageous Effects of Invention

The present invention can provide a lubricating structure configured such that: in normal time in which the main lubricating circuit is normal, an adequate amount of lubricating liquid is ejected; and in emergency of the main lubricating circuit, the lubrication target is appropriately lubricated by the auxiliary lubricating circuit, and therefore, the continuously operating ability can be improved.

BRIEF DESCRIPTION OF DRAWINGS

FIG. 1 is a diagram showing a transmission lubricating structure of a helicopter according to an embodiment.

DESCRIPTION OF EMBODIMENTS

Hereinafter, an embodiment will be described with reference to the drawing.

As shown in FIG. 1, a helicopter includes a transmission 1 configured to transmit power from a prime mover (for example, a turbine) to a rotary wing. The transmission 1 includes a power transmitting shaft 3 which is connected to the prime mover so as to be able to transmit power to the prime mover. The power transmitting shaft 3 of the present embodiment is arranged in such a posture as to be inclined relative to a horizontal direction and a vertical direction. However, the power transmitting shaft 3 may be arranged so as to extend in an upper-lower direction. A lubrication target is provided around the power transmitting shaft 3. For example, the lubrication target includes a plurality of bearings 5 (for example, ball bearings) supporting the power transmitting shaft 3 such that the power transmitting shaft 3 is rotatable. Since the transmission 1 needs to be appropriately lubricated by a lubricating liquid during operation, the helicopter includes a transmission lubricating structure 10.

The transmission lubricating structure 10 includes the power transmitting shaft 3, a main lubricating circuit 11, and an auxiliary lubricating circuit 12. The power transmitting shaft 3 is, for example, a hollow shaft including a shaft portion 3a and a bevel gear portion 3b provided at an upper end side of the shaft portion 3a. It should be noted that the type of a gear for a power transmitting operation is not especially limited, and a spur gear may be used instead of a bevel gear. A lower end of the power transmitting shaft 3 is closed. For example, a plug 4 is provided at the lower end of the power transmitting shaft 3. The plug 4 closes an internal space S of the hollow power transmitting shaft 3 from a lower side. It should be noted that instead of the plug, a baffle plate including holes which delay the discharge of the lubricating oil from the internal space S may be provided at the lower end of the power transmitting shaft 3.

The shaft portion 3a of the power transmitting shaft 3 is inserted into the plurality of bearings 5 (lubricated elements). The bearings 5 are adjacently arranged so as to be lined up in a substantially upper-lower direction. An opening portion 3c through which the lubricating liquid is introduced into the internal space S is formed at the power transmitting shaft 3. For example, the opening portion 3c is formed at an upper end of the power transmitting shaft 3 such that the internal space S is open upward. Ejection holes 3d which make the internal space S communicate with an outside are formed at the shaft portion 3a of the power transmitting shaft 3. The ejection holes 3d are directed to the bearings 5. The internal space S of the power transmitting shaft 3 communicates with an outside of the power transmitting shaft 3 through only the opening portion 3c and the ejection holes 3d.

The main lubricating circuit 11 includes a main tank 21, a hydraulic pump 22, a main nozzle 23, and a main line 24. The main tank 21 stores the lubricating oil. The hydraulic pump 22 supplies the lubricating oil by pressure from the main tank 21 to the main nozzle 23. The main nozzle 23 includes a nozzle hole 23a through which the lubricating oil supplied from the main tank 21 is discharged. The main nozzle 23 discharges the lubricating oil through the opening portion 3c of the power transmitting shaft 3 to the internal space S of the power transmitting shaft 3. The main line 24 forms a passage connecting the main tank 21 to the main nozzle 23. The hydraulic pump 22 is interposed on a portion of the main line 24.

In normal time in which the main lubricating circuit 11 is normal, the lubricating oil in the main tank 21 is supplied by the hydraulic pump 22 through the main nozzle 23 to the internal space S of the power transmitting shaft 3. The lubricating oil in the internal space S of the power transmitting shaft 3 is ejected through the ejection holes 3d of the power transmitting shaft 3 to the outside by the centrifugal force of the rotation of the power transmitting shaft 3. Frictional heat of the bearings 5 is suppressed by the lubricating oil which has reached the bearings 5.

The auxiliary lubricating circuit 12 includes an auxiliary tank 31, an auxiliary nozzle 32, a supply line 33, an auxiliary line 34, and a discharge line 35. The auxiliary tank 31 communicates with a discharge side of the hydraulic pump 22 through the supply line 33. Part of the lubricating oil supplied by pressure from the hydraulic pump 22 during a normal operation of the main lubricating circuit 11 is supplied through the supply line 33 to the auxiliary tank 31. Thus, the lubricating oil is stored in the auxiliary tank 31. It should be noted that instead of the configuration in which the supply line 33 branches from the main line 24, the supply line 33 may directly connect the main tank 21 and the auxiliary tank 31 to each other.

The lubricating oil which has exceeded a capacity upper limit of the auxiliary tank 31 is discharged through the discharge line 35 to be returned to the main tank 21. It should be noted that the discharge line 35 may not be connected to the main tank 21, and the lubricating oil discharged through the discharge line 35 may be introduced to a member (for example, another lubrication target) other than the main tank 21.

The auxiliary nozzle 32 is connected to the auxiliary tank 31 through the auxiliary line 34. The auxiliary nozzle 32 is arranged above the bearings 5 at the outside of the power transmitting shaft 3. A nozzle hole 32a of the auxiliary nozzle 32 is directed to the bearings 5. The size of the nozzle hole 32a of the auxiliary nozzle 32 is not especially limited. However, in the present embodiment, as one example, the nozzle hole 32a of the auxiliary nozzle 32 is formed smaller than the nozzle hole 23a of the main nozzle 23. The auxiliary tank 31 is arranged higher than the auxiliary nozzle 32. With this, the auxiliary nozzle 32 drops the lubricating liquid, supplied from the auxiliary tank 31 by the own weight of the lubricating liquid, toward the bearings 5.

In emergency in which the main lubricating circuit 11 malfunctions, the lubricating oil drops from the auxiliary nozzle 32 of the auxiliary lubricating circuit 12 to the bearings 5 by the own weight of the lubricating oil, and most of the lubricating oil from the auxiliary nozzle 32 reaches the bearings 5. Therefore, the bearings 5 are appropriately lubricated while suppressing a decreasing rate of the lubricating oil in the auxiliary tank 31 by making the nozzle hole 32a of the auxiliary nozzle 32 small. On this account, the continuously operating ability in emergency improves.

Moreover, the auxiliary line 34 is prepared separately from the main line 24. Therefore, even when abnormality occurs in the main line 24, the lubricating oil is appropriately supplied from the auxiliary tank 31 to the auxiliary nozzle 32. Furthermore, the auxiliary nozzle 32 drops the lubricating liquid to an uppermost one of the plurality of bearings 5, lined up in the substantially upper-lower direction, from above. Therefore, the lubricating liquid which has dropped from the auxiliary nozzle 32 serially lubricates the bearings 5 in order. Thus, the bearings 5 are suitably lubricated by a small amount of lubricating liquid.

The present invention is not limited to the above embodiment. Modifications, additions, and eliminations may be made with respect to the configuration of the embodiment. For example, the number of bearings 5 does not have to be plural and may be one. Moreover, not all the bearings supporting the power transmitting shaft 3 have to be lubricated by the auxiliary nozzle 32. For example, when the power transmitting shaft 3 is supported by a ball bearing and a roller bearing, the auxiliary nozzle 32 may be configured to discharge the lubricating liquid to the ball bearing and not to discharge the lubricating liquid to the roller bearing. Furthermore, the bearing 5 is the lubrication target, but another portion (for example, a gear meshing surface) may be the lubrication target. In the example shown in FIG. 1, the auxiliary tank 31 is arranged at a position higher than the main tank 21. However, the auxiliary tank 31 is only required to be arranged at a position higher than the auxiliary nozzle 32 and does not have to be arranged at a position higher than the main tank 21. Moreover, the lubricating oil is ejected from the ejection holes 3d of the power transmitting shaft 3 by the centrifugal force of the power transmitting shaft 3. However, the lubricating oil may be ejected by pressurization.

REFERENCE SIGNS LIST 1 transmission
3 power transmitting shaft
3d ejection hole
5 bearing
10 transmission lubricating structure
11 main lubricating circuit
12 auxiliary lubricating circuit
21 main tank
22 hydraulic pump
23 main nozzle
23a nozzle hole
24 main line
31 auxiliary tank
32 auxiliary nozzle
32a nozzle hole
33 supply line
34 auxiliary line
35 discharge line
S internal space

The invention claimed is:

1. A transmission lubricating structure of a helicopter, the transmission lubricating structure comprising:
a hollow power transmitting shaft including an ejection hole through which an internal space of the power transmitting shaft fluidically communicates with an outside of the power transmitting shaft, the power transmitting shaft being arranged in such a posture as to be inclined relative to a horizontal direction and a vertical direction of the helicopter in a landing state;
bearings supporting the power transmitting shaft such that the power transmitting shaft is rotatable, the bearings being adjacently arranged so as to be lined up in an axial direction of the power transmitting shaft;
a main lubricating circuit including
a main tank in which lubricating oil is stored,
a main nozzle having a nozzle hole through which the lubricating oil supplied from the main tank is discharged to the internal space of the power transmitting shaft, and
a hydraulic pump configured to supply the lubricating oil by pressure from the main tank to the main nozzle; and
an auxiliary lubricating circuit including
an auxiliary tank in which the lubricating oil is stored and
an auxiliary nozzle arranged lower than the auxiliary tank and higher than the bearings at the outside of the power transmitting shaft, the auxiliary nozzle facing an uppermost one of the bearings in an alignment direction where the bearings are lined up, the auxiliary nozzle being configured to drop the lubricating oil, supplied from the auxiliary tank by an own weight of the lubricating oil, toward the uppermost one of the bearings from above in the alignment direction.

2. The transmission lubricating structure according to claim 1, wherein a nozzle hole of the auxiliary nozzle is smaller than the nozzle hole of the main nozzle.

3. The transmission lubricating structure according to claim 1, wherein:
the main lubricating circuit includes a main line through which the lubricating oil in the main tank is introduced to the main nozzle; and
the auxiliary lubricating circuit includes
a supply line through which the lubricating oil in the main tank is introduced to the auxiliary tank and
an auxiliary line through which the lubricating oil in the auxiliary tank is introduced to the auxiliary nozzle.

* * * * *